US005740044A

United States Patent [19]

Ehrenhardt et al.

[11] Patent Number: 5,740,044

[45] Date of Patent: Apr. 14, 1998

[54] TORQUE LIMITING POWER TAKE OFF CONTROL AND METHOD OF OPERATING SAME

[75] Inventors: Kevin D. Ehrenhardt, Eureka; Gregory S. Gauger, Pekin; Prasad V. Parupalli, Peoria; Thomas R. Sandborg, Mapleton, all of Ill.

[73] Assignee: Caterpillar Inc., Peoria, Ill.

[21] Appl. No.: 491,443

[22] Filed: Jun. 16, 1995

[51] Int. Cl.[6] .......... B60K 41/20; F02D 31/00

[52] U.S. Cl. .......... 364/426.033; 364/426.036; 364/424.07; 364/431.052; 318/434; 74/11

[58] Field of Search .......... 364/424.01, 431.01, 364/431.03, 431.05, 431.07, 431.09, 431.12, 436, 426.03, 424.07, 426.033, 426.036, 424.08, 424.083, 424.084; 74/11; 477/43, 48, 110, 107, 108, 185, 111; 123/357

[56] References Cited

U.S. PATENT DOCUMENTS

| | | | |
|---|---|---|---|
| 3,913,419 | 10/1975 | Sale et al. | 477/54 |
| 4,917,063 | 4/1990 | Hiraki | 123/357 |
| 5,034,892 | 7/1991 | Saotome | 364/424.07 |
| 5,121,324 | 6/1992 | Rini et al. | 364/431.05 |
| 5,268,842 | 12/1993 | Marston et al. | 364/431.05 |
| 5,508,923 | 4/1996 | Ibamoto et al. | 364/426.01 |

OTHER PUBLICATIONS

Publication T444E Product Training (Part Two) by International from Navistar (month and year are not available).

*Primary Examiner*—Tan Q. Nguyen
*Attorney, Agent, or Firm*—R. Carl Wilbur

[57] ABSTRACT

A control for limiting the torque output of an engine when operating in a PTO mode is provided. The control includes a microprocessor connected to a PTO on/off switch, a set/resume switch and a torque limit on/off switch. When the torque limit switch is in an on position, the microprocessor limits the maximum torque output to an operator programmed value. The operator can reprogram the torque limit value with a programming tool.

5 Claims, 3 Drawing Sheets

TORQUE LIMITING POWER TAKE OFF CONTROL AND METHOD OF OPERATING SAME

TECHNICAL FIELD OF THE INVENTION

The present invention relates to on-highway trucks, and more particularly, to on-highway trucks having a power-take-off.

BACKGROUND OF THE INVENTION

Many on highway trucks and other vehicles require a power-take-off (hereinafter referred to as a "PTO") to provide power to run accessories that may include a cement mixer on a cement truck or a trash compactor on a garbage truck. Oftentimes it is desirable to control the power output and speed of the PTO from a position other than the truck cab. For example, a garbage truck uses a compactor that is connected to the PTO to compact trash. During the compaction cycle, the compactor requires increased torque from the PTO which, in turn, requires increased engine power. The operator must be able to control the engine output during the compaction cycle to provide sufficient power to the compactor to prevent the engine from stalling. Obviously, it is inconvenient and more difficult to accurately control the engine to satisfy the compactor power requirements when the operator must use the accelerator pedal in the truck cab. It would be preferable to control the engine while standing beside the vehicle where the operator could see the compactor and gauge the completeness of the cycle.

In some applications, the vehicle may require significant torque for propulsion, but much less torque to drive the PTO accessory (i.e. cement mixer, trash compactor, etc.). In those applications the engine may develop higher torque level than the PTO accessory can accept without damaging the accessory or subjecting it to undue wear. Thus, when prior art PTO controls are used, it is important for the PTO operator to maintain engine torque output at a level less than the accessory torque rating. While this may be possible with an experienced operator that is familiar with the vehicle, there are many instances where drivers may be rotated between different vehicles and thus an operator may not be completely familiar with the torque limitations of the vehicle/accessory combination. Even for an experienced operator, it is more demanding to have to monitor the engine speed and torque output.

Some engine manufacturers recognize these drawbacks and have an optional factory installed torque limiting feature on their engines. In those engines a second, reduced torque curve is provided which is used when the vehicle operator actuates a torque limit switch. While this approach may, at times, be successful, there are several drawbacks. For example, in the prior art devices, the reduced torque limit curve is fixed at the factory and cannot be changed by the owner or operator. Thus, if the PTO accessory's performance degrades over time such that it is no longer able to accept the same torque level as a new accessory, the torque limit feature might not adequately protect the accessory. In addition, if an accessory is replaced with a different accessory having different torque capabilities, the torque limit features of the engine may not adequately protect the new accessory. It would therefore be preferable to provide a programmable torque limit that would permit the owner or operator to program a torque limit.

Another drawback associated with prior art torque limit features is that engine is controlled according to the reduced torque curve across the entire operating range. It would be preferable to allow the engine to produce normal torque levels at those speeds where the torque does not exceed the accessory torque limit, then to limit torque output only when excessive levels might be produced.

The present invention is directed toward overcoming one or more of the foregoing problems associated with prior art PTO controls.

SUMMARY OF THE INVENTION

It is an object of an embodiment of tire present invention to provide a torque limit feature for use with a PTO control that will limit the maximum torque output of the engine without otherwise modifying the torque curve.

It is a further object of an embodiment of the present invention to provide means to permit a vehicle operator to program a desired maximum torque output and to reprogram that value when appropriate.

To accomplish these and other objects,an apparatus for controlling the maximum torque output of an engine when said engine is operating in a PTO mode is disclosed. The engine is connected to a microprocessor. The vehicle operator programs a desired torque limit value into memory connected to the microprocessor. A torque limit on/off switch is connected to the microprocessor. When the torque limit on/off switch is turned to an on position, the microprocessor limits the maximum torque output of the engine to the desired torque limit value stored in memory.

Still other objects and advantages of the present invention will become apparent upon reading the detailed description of a preferred embodiment in connection with the drawings and appended claims.

BRIEF DESCRIPTION OF THE DRAWINGS

Throughout the drawings and the specification like reference numbers refer to like elements.

DETAILED DESCRIPTION OF A PREFERRED EMBODIMENT

Figure 1:
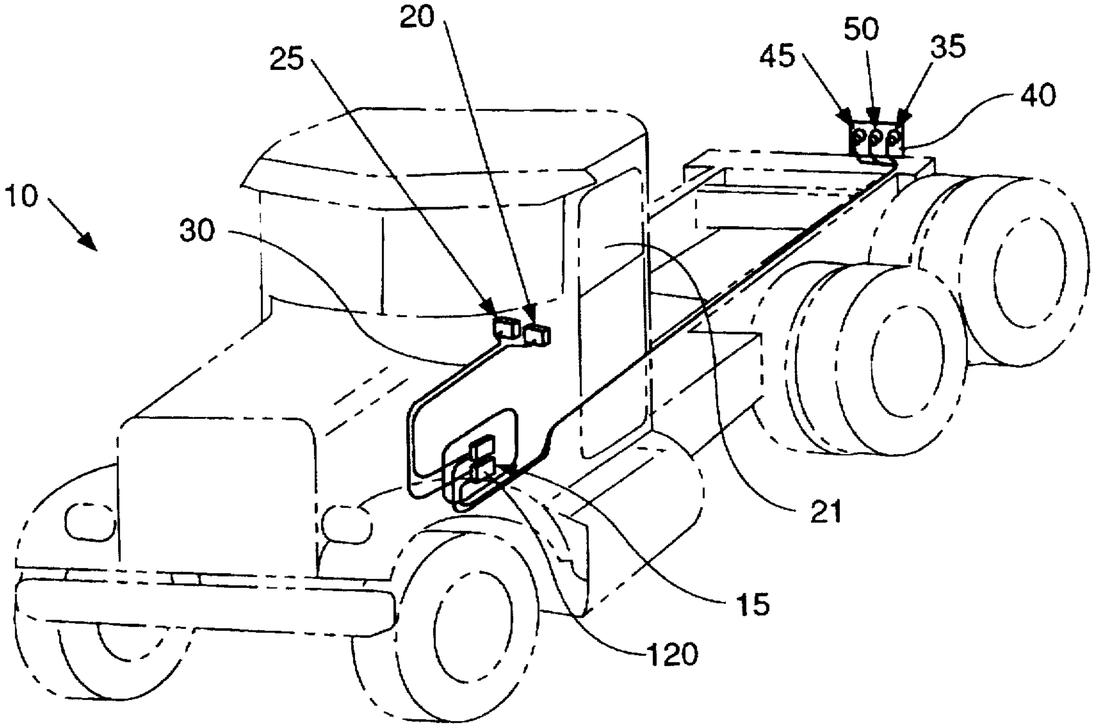
FIG. 1 is an isometric drawing of an on-highway truck employing a preferred embodiment of the PTO control of the present invention.

Referring first to FIG. 1, a vehicle 10 is shown that incorporates an embodiment of the PTO control of the present invention. The PTO controller 15 is preferably attached inside the engine compartment of the vehicle 10. However, other locations can be selected for the PTO controller 15 without deviating from the scope of the present invention as defined by the appended claims. As described in more detail below, the PTO controller 15 preferably includes a microprocessor 120, although other suitable electrical controls may be used. The microprocessor 120 is electrically connected to a PTO on/off switch 20 and a first PTO lamp 25 through a wiring harness 30 or other suitable electrical connection. The PTO on/off switch 20 and the first PTO lamp 25 are preferably located in the operator compartment 21. A PTO set/resume switch 35 is preferably located on a remote control panel 40 and is electrically connected to the microprocessor 120 by the wiring harness 30 or other suitable electrical connector. In a preferred embodiment, the remote control panel 40 also includes a torque limit on/off switch 50 and a second PTO lamp 45 both of which are electrically connected to the microprocessor 120 by the wiring harness 30 or other suitable electrical connector.

Figure 2:
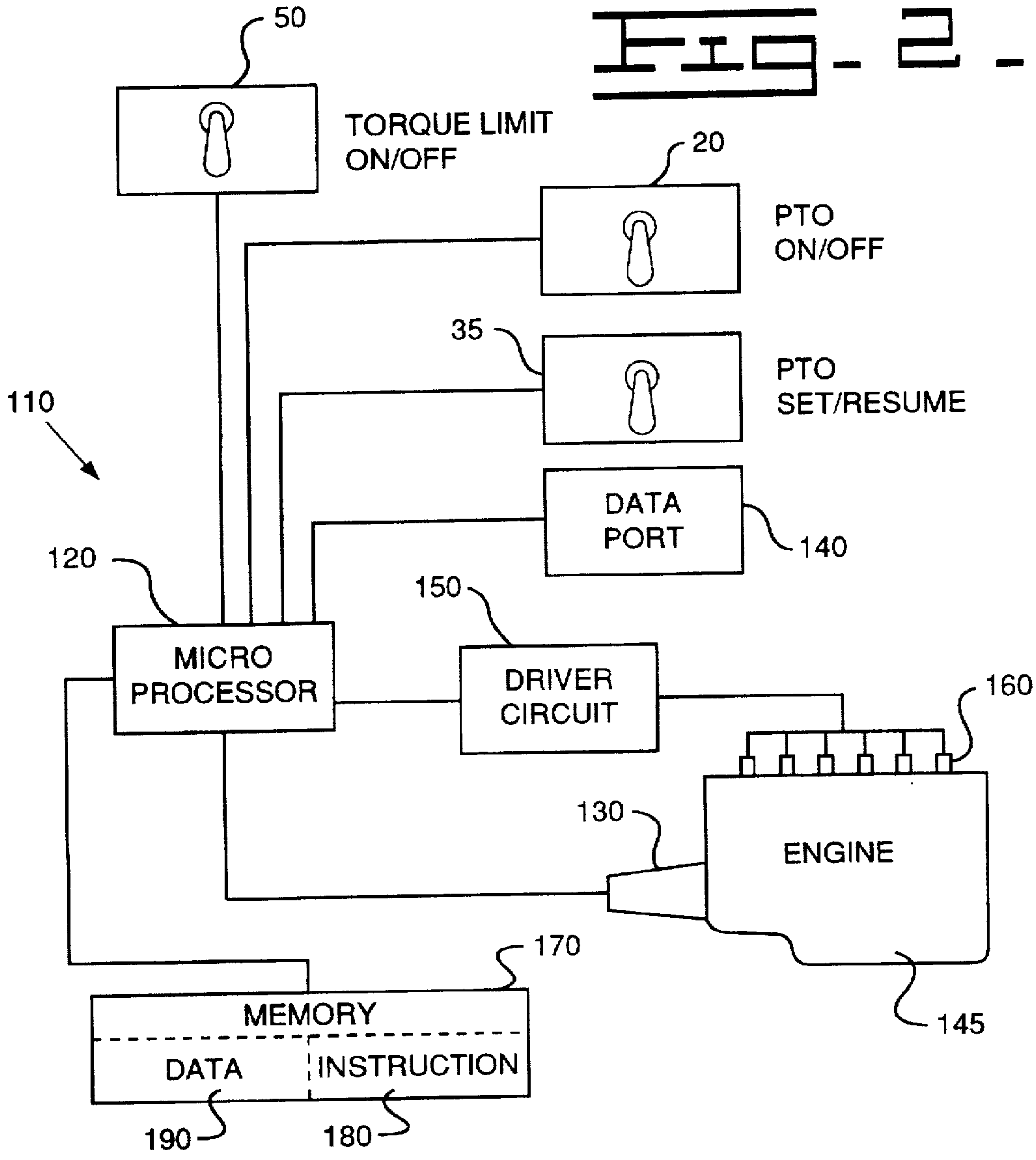
FIG. 2 is a block diagram of a preferred embodiment of the PTO control of the present invention.

Referring now to FIG. 2, a schematic block diagram of a preferred embodiment of the PTO control 110 of the present invention is shown. The control 110 includes a PTO controller 15, which in the preferred embodiment is a microprocessor 120. The microprocessor 120 used in a preferred embodiment is a Motorola 6811K4 microprocessor, manufactured by Motorola Semiconductor Products, Inc. located Phoenix, Ariz. However, other suitable microprocessors are known in the art and could be readily and easily substituted without deviating from the scope of the present invention as defined by the appended claims.

The microprocessor 120 is connected to memory 170 which may include both software instructions 180 and data 190 such as look up tables or other information. As shown in FIG. 2, the memory 170 and microprocessor 120 are separate components. However, as known to those skilled in the art, certain microprocessors include memory. The present invention is not limited to microprocessors requiring a discrete memory component. To the contrary, the present invention includes all other types of microprocessors that fall within the scope of the present invention as defined by the appended claims.

The microprocessor 120 is connected to an engine speed/timing sensor 130. The engine speed timing sensor 130 is attached to an engine 145 and preferably senses the rotational speed of the engine crankshaft (not shown) and produces a pulse width modulated signal whose duty cycle is a function of the rotational speed of the rotation crankshaft. The ECM is also connected to driver circuitry 150 which, in turn, is connected to fuel injectors 160 installed in individual cylinders of the engine 145. Although FIG. 2 shows the engine 145 having six injectors 160, the engine 145 may include more or less than six cylinders and injectors 160.

As is known to those skilled in the art, the microprocessor 120 produces a fuel injection signal and delivers it to driver circuitry 150. The driver circuitry 150 then produces a corresponding injection signal that is delivered to the individual fuel injectors 160. The microprocessor 120 calculates the timing and duration of the fuel injection signal as a function of various sensed engine parameters including the signal delivered from the speed/timing sensor 130 and other inputs such as a desired engine speed signal (not shown) determined as a function of the position of an accelerator pedal (not shown), and as a function of the data 190 and instructions 180 stored in memory 170. Speed/timing and fuel delivery calculations performed in response to the value of various sensor inputs are well known in the art. Those skilled in the art could readily and easily program a microprocessor to calculate the timing and fuel injection signals from the various inputs. Driver circuitry 150 is also well known in the art. Any such circuit can be used in connection with the embodiment described herein.

The microprocessor 120 is electrically connected to the PTO on/off switch 20, and to the PTO set/resume switch 35. In a preferred embodiment, the PTO controller 15 is also electrically connected to the torque limit on/off switch 50. However, as will be described in more detail below, in an alternative embodiment the torque limit on/off switch 50 can be omitted while retaining the torque limiting feature of the present invention. Also shown in FIG. 2 is a data port 140 that is electrically connected to the microprocessor 120. As described in more detail below, the data port may comprise a data connection that allows the fleet operator or owner/operator to connect a programming device to the microprocessor to reprogram certain parameters including torque limit value.

Figure 4:
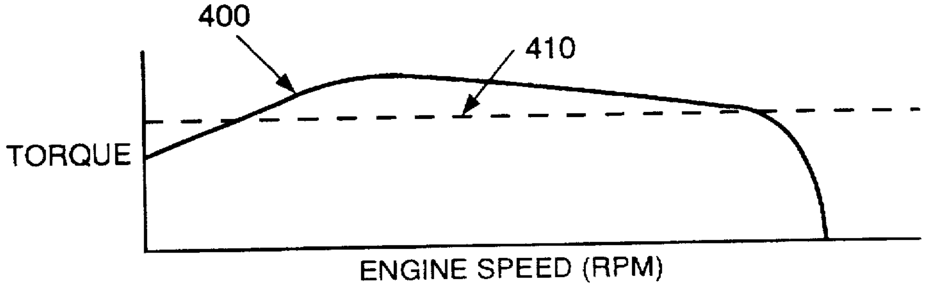
FIG. 4 is a graph showing an example of the torque limiting control achievable with an embodiment of the PTO control of the present invention.
Figure 3:
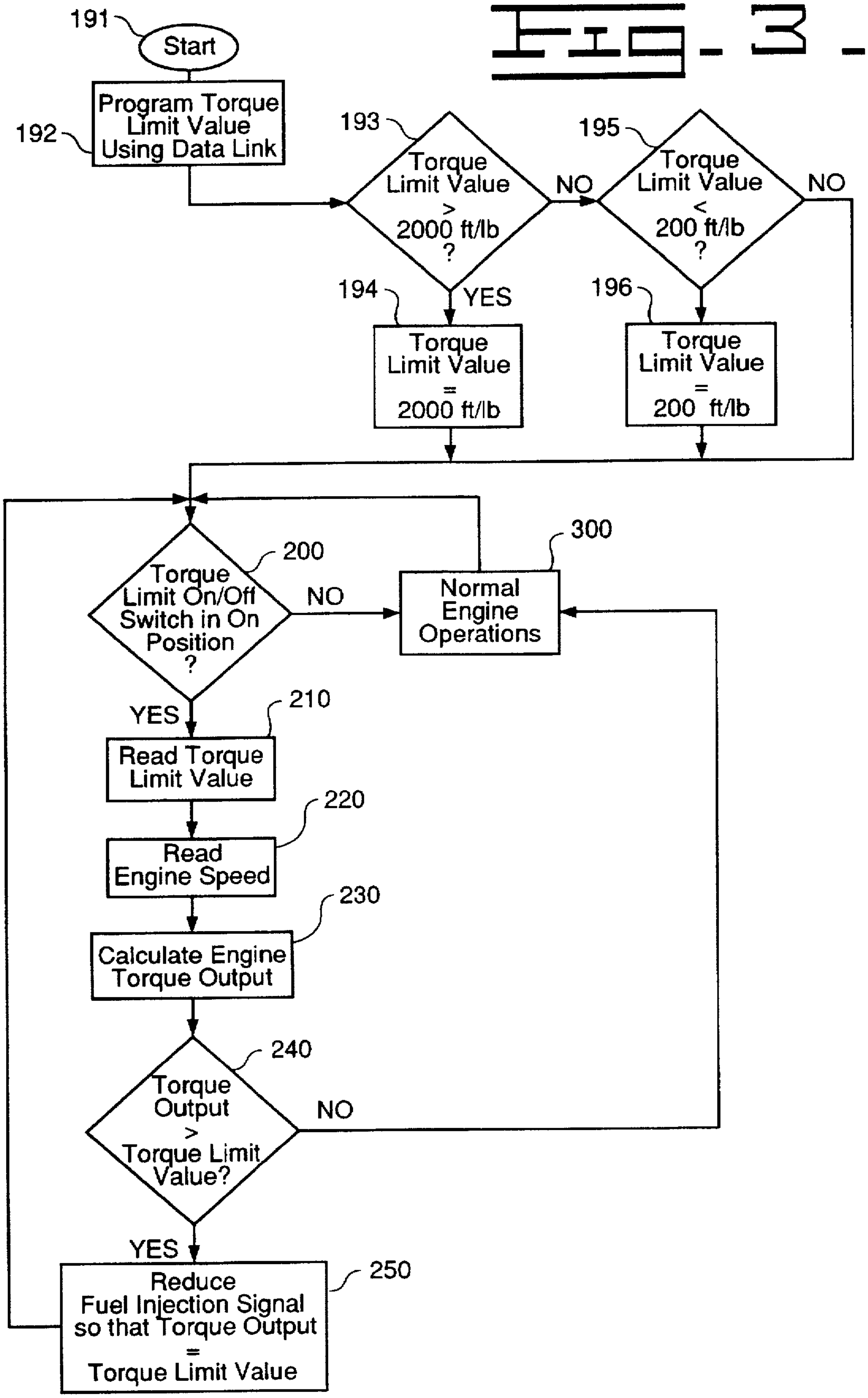
FIG. 3 is a flowchart of an embodiment of the software used in a preferred embodiment of the present invention.

Referring now to FIGS. 3 and 4, a flow chart of the software for programming the microprocessor 120 and a graph showing the torque limiting feature of a preferred embodiment of the invention are shown. The program depicted in the flowchart is particularly well adapted for use with the 6811K4 microprocessor and associated components described above, although any suitable microprocessor may be utilized in practicing an embodiment of the present invention. The flowchart constitutes a complete and workable design of the preferred software program, and has been reduced to practice on the series 6811K4 microprocessor system. The software program may be readily coded from the detailed flowchart using the instruction set associated with this system, or may be coded with the instructions of any other suitable conventional microprocessor. The process of writing software code from a flowchart and graph such as these is a mere mechanical step for one skilled in the art.

Referring first to FIG. 3, program control begins in block 191 and passes to block 192. In block 192 a fleet operator or vehicle owner programs the torque limit value into memory 170 using a service tool or other programming device connected to the data port 140. Control then passes to block 193.

Blocks 193 through 196 perform a check on the torque limit value entered in block 192 against an upper and lower limit. The upper limit is preferably determined by the rated torque for the engine. The lower limit is approximately 200 ft/lbs. It should be recognized that other values might be programmed without deviating from the spirit and scope of the present invention as defined by the appended claims.

In block 193 the program determines whether the torque limit value that was entered in block 192 exceeds the rated torque for the engine. If the torque limit value entered in block 192 is greater than the engine's rated torque, then there is no torque limiting, because the limit value is higher than the torque that the engine is able to produce. Control then passes to block 194. When the torque limit value is set to rated torque. From block 194 program control passes to block 200.

If, in block 193 the value entered in block 192 does not exceed the upper limit, then program control passes to block 195. In block 195, the program determines whether the entered value is less than a lower limit value, which in a preferred embodiment is approximately 200 ft/lbs. If the entered value is less than 200 ft/lbs, then program control passes to block 196, otherwise program control passes to block 200. In block 196 the torque limit value is set to 200 ft/lbs. Program control then passes to block 200.

In block 200 the microprocessor 120 determines whether the Torque limit on/off switch 50 is in the on position. If the switch 50 is in the on position, then program control passes to block 210. Otherwise, program control passes to block 300. As noted above, there may be some applications in which there is no Torque limit on/off switch 50. In those cases, in block 200 the program control will determine whether the PTO on/off switch is in the on position. If it is, then program control will proceed to block 210 in the same manner as stated above. Likewise if the PTO on/off switch is in the off position then program control passes to block 300.

In block 210, the program reads the torque limit value. Program control then passes to block 220. In block 220, the microprocessor 120 reads the signal produced by the engine speed sensor 130. Program control then passes to block 230. In block 230 the program calculates the torque output for the engine. Program control then passes to block 240.

In block 240, the program determines whether the torque output calculated in block 230 exceeds the torque limit value. If decision block 240 is yes then program control passes to block 250. Otherwise program control passes to block 300.

In block 250, the microprocessor 120 calculates a reduced fuel injection signal to cause the torque output to equal the programmed torque limit value. Program control then returns to block 200.

In block 300, the engine runs at its normal torque output for that engine speed. Program control then returns to block 200.

Referring now to FIG. 4, a torque curve 400 is shown for an engine running without the torque limit feature of an embodiment of the present invention. Also shown is a torque limiting curve 410, representing the torque output of the engine when operating with the torque limit on/off switch in the on position. Note that the dashed line in FIG. 4 represents the torque limit value programmed in block 192 of the flowchart (or subsequently limited in blocks 193–196). Thus, when the engine 145 produces torque levels below the level of the torque limiting curve 410, the torque output is calculated using curve 400. When the values produced by curve 400 exceed the level of the torque limiting curve 410, then the torque output is calculated from the torque limiting curve 410. Thus, as the engine torque output exceeds the torque limit value, the microprocessor 120 reduces fuel flow to the engine to cause the torque output to correspond to the torque limit value.

Industrial Applicability

In operation, the preferred embodiment described herein permits the vehicle operator to set the engine to a predetermined speed when operating in PTO mode. At that speed, the engine should provide sufficient power to drive the PTO accessory. At the same time, when the torque limiting feature is engaged, the control will limit the torque output of the engine to the torque limit of the accessory. In this manner, the present control will assist in preventing damage or excessive wear that might otherwise be caused by an operator's application of excessive torque.

To operate the present control, the operator will turn the PTO on/off switch 20 to the on position. The PTO control then controls the speed of the engine to a programmed PTO speed. Subsequently, the operator can vary the programmed engine speed by moving the set/resume switch 35 to the resume position or could decrease the programmed engine by moving it to the set position.

By moving the torque limit on/off switch 50 to the on position, the control will then limit the engine torque output. Thus, the operator can insure that the torque output remains below a desired level.

We claim:

1. An apparatus for controlling a vehicle engine, said engine being connected to a power-take-off, the apparatus automatically limiting the maximum torque output of the engine, said apparatus comprising:
   - a microprocessor;
   - a torque limit on/off switch being positionable in an on position and in an off position and being electrically connected to said microprocessor;
   - memory means electrically connected to said microprocessor;
   - driver circuitry electrically connected to said microprocessor and electrically connected to a fuel injector;
   - speed sensing means connected to said engine for producing an electrical signal corresponding to said engine speed, said speed sensing means being electrically connected to said microprocessor;
   - a torque limit value stored in said memory means;
   - a torque curve stored in said memory means;
   - wherein said microprocessor produces a fuel injection signal delivered to said driver circuit as a function of the torque curve when said torque limit on/off switch is in the off position; and
   - wherein said microprocessor produces a fuel injection signal delivered to said driver circuit as a function of the torque curve when the value of said curve is less than said torque limit value and as a function of said torque limit value when said torque curve is greater than or equal to said torque limit value when said torque limit on/off switch is in the on position.

2. The apparatus according to claim 1, further including:
   - a data port electrically connected to said microprocessor, said data port being connectable to an external programming device.

3. The apparatus according to claim 2, wherein said torque limit value is an operator programmable value and in programmed using said external programming device.

4. The apparatus according to claim 1, further including:
   - a PTO on/off switch having an on position and an off position and producing an output signal responsive to said position;
   - a set/resume switch having a set position and a resume position and producing an output signal responsive to said position;
   - wherein said microprocessor stores a programmed PTO speed in response to said PTO on/off switch output signal and said set/resume switch output signal; and
   - wherein said microprocessor controls the speed of the engine to a programmed PTO speed when said PTO on/off switch is in said on position.

5. The apparatus according to claim 4, wherein said microprocessor increases said programmed PTO speed in response to said set/resume switch being moved to said resume position and decreases said programmed PTO speed in response to said set/resume switch being moved to said set position.

* * * * *